Feb. 2, 1965   H. A. SCHURICHT ETAL   3,168,177
CLAMP FOR FLEXIBLE CHUTE
Filed Jan. 4, 1963   2 Sheets-Sheet 1
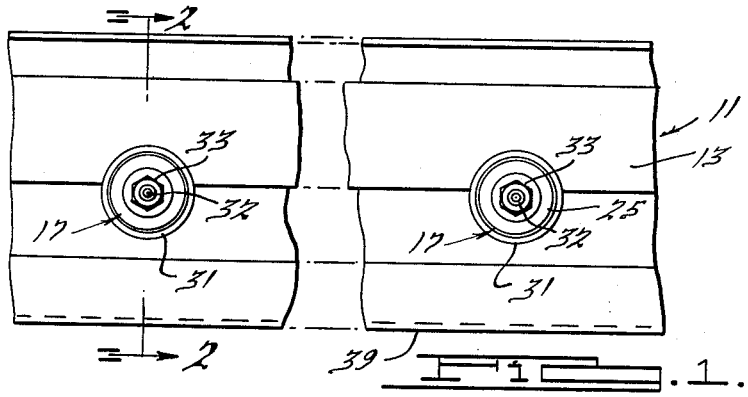
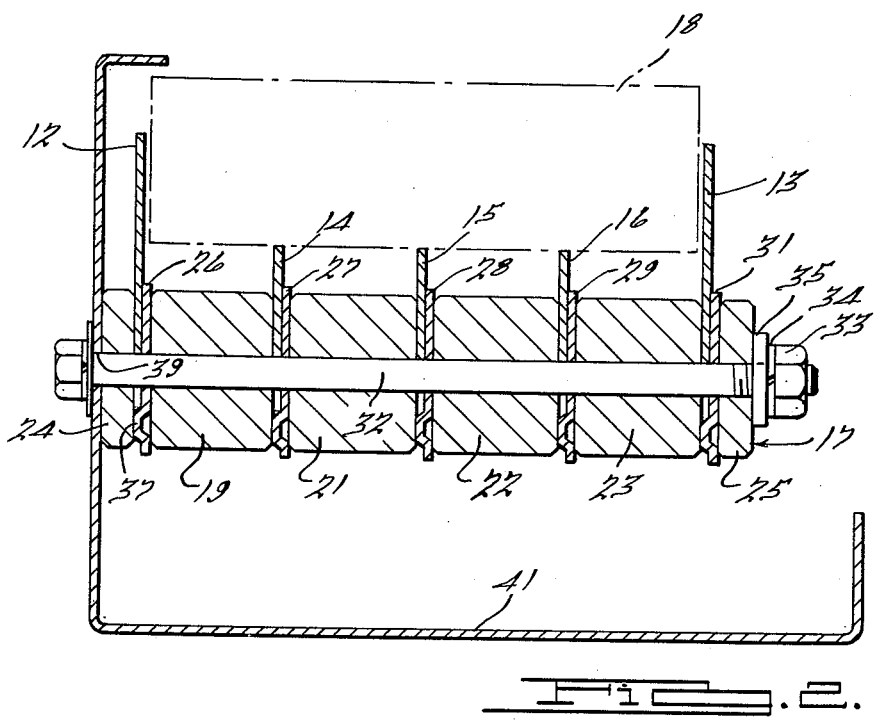
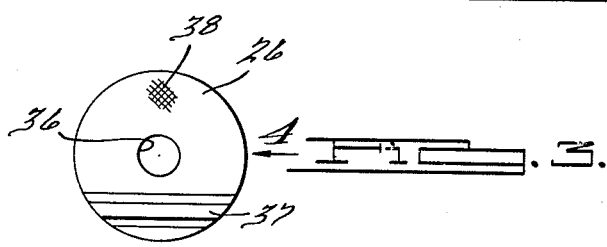
INVENTORS.
Henry A. Schuricht
Homer G. Whitfield
BY
Harness, Dickey & Pierce
ATTORNEYS

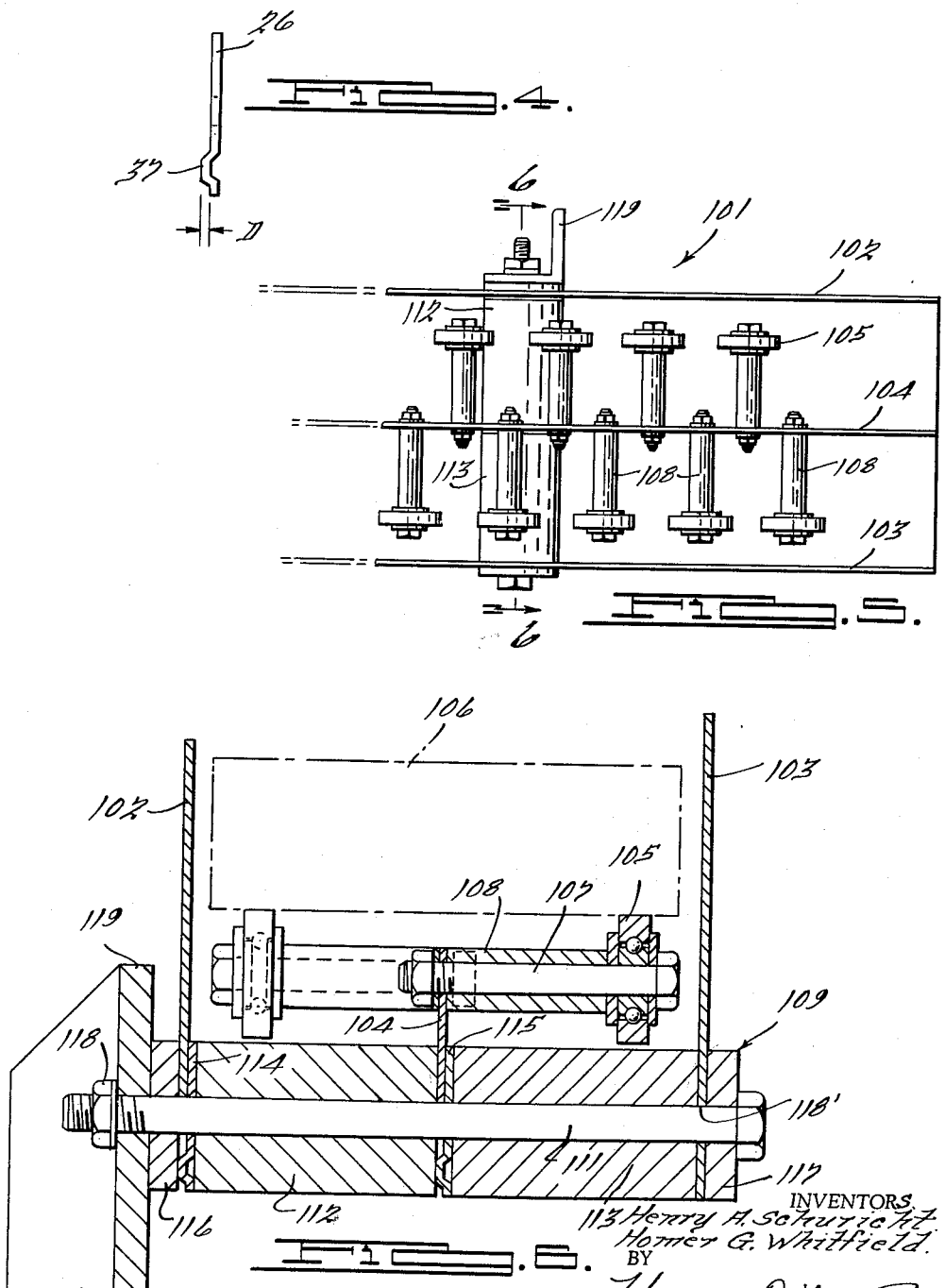

3,168,177
CLAMP FOR FLEXIBLE CHUTE
Henry A. Schuricht, Pontiac, and Homer G. Whitfield, Clarkston, Mich., assignors, by mesne assignments, to Hydromation Engineering Company, Plymouth, Mich., a corporation of Michigan
Filed Jan. 4, 1963, Ser. No. 249,391
2 Claims. (Cl. 193—25)

This invention relates to clamps for flexible chutes, and more particularly for chutes of the type having spaced parallel metal bands and used for conveying semi-finished parts between stations in a factory.

It is an object of the invention to provide a novel and improved clamping means for flexible chutes which permits a wide selection of chute widths, and in which widths changes may be accomplished with a minimum of difficulty.

It is another object to provide an improved flexible chute clamping means which is relatively inexpensive to fabricate and eliminates the use of machined parts previously found necessary in clamps of this nature.

Other objects, features, and advantages of the present invention will become apparent from the subsequent description, taken in conjunction with the accompanying drawings, in which:

FIGURE 1 is a side elevational view of a portion of a flexible chute used for conveying circular parts and incorporating the clamping means of this invention;

FIGURE 2 is a cross-sectional view in elevation taken along the line 2—2 of FIGURE 1 and showing the manner in which the clamping means is secured to the bands;

FIGURE 3 is aside elevational view of a clamping disc;

FIGURE 4 is an end elevational view of the clamping disc taken in the direction of the arrow 4 of FIGURE 3;

FIGURE 5 is a top plan view of a portion of a modified flexible chute used for conveying noncircular parts and incorporating clamping means constructed in accordance with the present invention; and FIGURE 6 is a cross-sectional view in elevation taken along the line 6—6 of FIGURE 5 and showing the manner in which the bands are secured to the clamping means.

Briefly, the clamping means of the present invention is adapted for use with horizontal or inclined flexible chutes of the type having a plurality of flexible steel bands in parallel relation, the two outer bands serving as guides for semi-finished workpieces such as gears, while the intermediate band or bands serve to support the workpieces. The clamp assemblies are secured to the bands at the spaced points therealong. Each clamp assembly comprises a number of cylindrical spacers between which are interposed washer like clamping discs. Each clamping disc comprises a circular piece of metal having a central aperture. The disc is generally flat but has a laterally offset ridge on one side of the aperture which may be formed by stamping during manufacture of the disc. The offset portion is disposed between two parallel chords of the circle formed by the disc, and the offset distance is approximately equal to the thickness of the metal band being clamped. In use, the discs are placed between the spacers, the latter being chosen of proper length for the desired chute width and having central apertures aligned with the apertures of the discs and through which a bolt extends. The bands are inserted in the spaces formed between the discs and spacers by the disc offsets, and on the side of the bolt opposite the offsets, the band edges resting on the bolt. The stack is then drawn into clamping relation with the bands by tightening the bolt.

Referring more particularly to the drawings, the flexible chute of FIGURES 1 and 2 is generally indicated at 11 and comprises a pair of side bands 12 and 13, three supporting bands 14, 15 and 16, and a plurality of clamping assemblies generally indicated at 17. As mentioned previously, chute 11 may extend between machine stations in an industrial establishment, and may be formed in any desired curvature, clamping assemblies 17 assisting in retaining the curvature of chute 11 by clamping bands 12 to 16 in their curved positions at spaced points therealong. Bands 12 and 13 are higher than bands 14, 15 and 16 and serve to retain workpieces such as that indicated in dot-dash lines at 18 against lateral movement, the workpieces being of circular shape and rolling along the upper edges of supporting bands 14, 15 and 16. All bands 12 to 16 are preferably fabricated of spring-like metal strip having the same thickness.

Each clamping assembly 17 comprises four spacing members 19, 21, 22 and 23, outer clamping members 24 and 25, five clamping discs 26, 27, 28, 9 and 31, a bolt 32, a nut 33, and washer members 34 and 35.

Spacing members 19, 21, 22 and 23 as well as outer clamping members 24 and 25 are fabricated of cylindrical or bar stock cut to appropriate lengths and provided with central apertures. The lengths of members 19, 21, 22 and 23 will be chosen in accordance with the desired width of chute 11 as well as the desired spacing between the adjacent bands. Thus, it will be a relatively simple matter to construct chutes 11 of various widths merely by choosing different lengths for the spacing members. The lengths of clamping members 24 and 25 will be relatively short since they are used merely for clamping rather than spacing purposes.

Each disc is made identically with the disc 26 shown in FIGURES 3 and 4. Preferably, the disc is a metal stamping of circular shape, having a central aperture 36. The disc is generally flat, but has a raised or spacing portion 37 which is offset or forced out of the main plane of the disc.

Spacing portion 37 is of elongated shape, and is disposed between two imaginary parallel chords of the circle formed by the disc, both chords lying on the same side of the disc center and spaced a substantial distance therefrom. As seen in FIGURES 3 and 4, the main outer surface of portion 37 is flat and parallel to the main surfaces of disc 26, and inclined surfaces connect the main surface with the disc. The distance D between the outer surface of portion 37 and the adjacent surface of the disc is equal to the thickness of each band 12 to 16. If desired, serrations or knurls 38 may be provided on the surfaces of the discs having offset portions 37. Such serrations or knurls will assist in gripping the bands when in their clamped position.

In using clamping assembly 17, the parts will be assembled as shown in FIGURE 2. Bolt 32 will be passed through an apertured portion 39 of a drip pan 41; the drip pan does not form part of the present invention but is shown to merely illustrate a typical installation. End clamping member 24 will be placed on the bolt, and the lower portion of band 12 will be placed against member 24. Clamping disc 26 will be placed on bolt 32, with portion 37 of the clamping disc facing member 24. Spacer 19 will be placed on bolt 32, and the succeeding bands, clamping discs and spacers will be placed on the bolt in a manner which is obvious from a study of FIGURE 2. A clamping disc will be adjacent each band and its raised portion will face in the direction of the band so that a space will be created between the clamping disc and the adjacent spacer. It should be noted that the outer flat surface of disc portion 37 will in each case engage the facing flat surface of the adjacent spacer 19, 21, 22 or 23, and that disc portion 37 and the corresponding band will be on opposite sides of bolt 32, the band edges resting against the bolt.

Upon tightening nut 33, the assembly will be drawn together. Raised portions 37 of the discs will be forced against the adjacent spacing members, thus creating, in effect, pivots about which the discs will tend to rock, forcing the upper portions of the discs against the bands and clamping the bands securely in position. It should be kept in mind that the amount of such pivoting action will be very slight since the height of portions 37 is equal to the thickness of the band. This will insure that the bands are engaged by surface areas of the spacing members and the clamping discs, the frictional clamping effect thus being substantial. The radii of the spacing members and clamping discs will, of course, be smaller than the heights of the supporting bands 14, 15 and 16, so that the upper edges of these bands will be exposed for supporting workpieces 18.

FIGURES 5 and 6 illustrate another type of chute generally indicated at 101 which is used for noncircular parts and which is shown in conjunction with the same type of clamping assembly as assembly 17. In FIGURES 5 and 6, two side bands 102 and 103 are shown, together with a single supporting band 104 disposed centrally between bands 102 and 103. Band 104 supports a plurality of rollers 105 on anti-friction bearings and which are adapted to permit the transfer of noncircular workpieces such as that shown in dot-dash lines at 106. Rollers 105 are supported in cantilever fashion by bolts 107 which extend alternately from opposite sides of band 104 and carrying spacers 108 disposed between band 104 and the bearings for rollers 105.

The clamping assembly is generally indicated at 109 and comprises a bolt 111, two spacing members 112 and 113, two identical clamping discs 114 and 115, a pair of outer spacing members 116 and 117, and a nut 118.

In using clamping assembly 109, the parts will be assembled as shown in FIGURE 6, with discs 114 and 115 serving the same function as the discs described with respect to the embodiments of FIGURES 1 and 2. That is, disc 114 will serve to clamp side band 102 while disc 115 serves to clamp supporting band 104. In the arrangement of FIGURES 5 and 6, side band 103 is shown as clamped directly between spacing members 113 and 117, being wider than band 102 and having an apertured portion 118' through which bolt 111 extends. By passing bolt 111 through an aperture in band 103, assembly 109 cannot drop to the floor when it is loosened. This might otherwise occur if the clamping assembly were attached to the bands merely by the frictional connection described with respect to the embodiment of FIGURES 1 and 2. Of course, it would not be advantageous to have bolt 111 pass through apertures in all the bands, since this would require a large number of apertures in the bands in order that a wide selection of positions for the clamping assemblies be permitted. FIGURES 5 and 6 also show a stationary support 119 through which bolt 111 extends and which may be used to support chute 101.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In combination with a flexible chute of the type having a plurality of flexible metal bands in spaced parallel relation, a clamping assembly comprising at least one spacing member comprising a length of bar stock and having flat ends, said spacing member being disposed between two of said bands, a clamping disc of generally flat circular shape but having an elongate laterally offset portion occupying a space between two parallel chords on the circle formed by said disc, the distance between the outer surface of said offset portion and the adjacent main surface of said disc being equal to the thickness of the adjacent band, the other main surface of said disc being in engagement with one of the flat ends of said spacing member, the adjacent band being in engagement with the main disc surface on the side having said offset portion but spaced from said offset portion, a member having a flat surface in engagement with the outer surface of said offset portion and said band, and means for drawing said last-mentioned member toward said disc, whereby said adjacent band will be frictionally clamped between said disc and said last-mentioned member.

2. In a flexible chute having a pair of elongate flat flexible side bands and at least one elongate flat flexible supporting band located between said side bands, said bands being disposed on edge and extending in spaced generally parallel relationship to each other; a clamping assembly comprising a plurality of elongate flat ended spacing members each having a longitudinally extending bolt receiving opening therethrough, a clamping bolt extending through the openings in at least two of said spacing members to support a spacing member between each pair of adjacent sides of adjacent bands of said chute with said bolt passing transversely beneath said bands in underlying supporting engagement with the lower edges of said bands, a plurality of washer-like clamping members each having a centrally located bolt receiving aperture therethrough, said bolt passing through the apertures of said clamping members to support a clamping member between one end of each spacing member and the adjacent band, each clamping member having a flat portion engaged between the band end spacing member and above said bolt and a ridge portion on the clamping member below the bolt laterally offset from the flat portion by a distance equal to the thickness of the band to engage adjacent ends of adjacent spacing members below said bolt when a band and flat portion of the clamping member are gripped between the adjacent ends of adjacent spacing members above said bolt.

References Cited by the Examiner

UNITED STATES PATENTS

| | | | |
|---|---|---|---|
| 2,744,601 | 5/56 | Chilton | 193—25 |
| 2,815,841 | 12/57 | Dabich | 193—25 |
| 2,947,401 | 8/60 | Schuricht et al. | 193—25 |
| 2,948,375 | 8/60 | Dabich | 193—25 X |

SAMUEL F. COLEMAN, *Acting Primary Examiner.*